(12) United States Patent
Chen

(10) Patent No.: US 8,791,597 B2
(45) Date of Patent: Jul. 29, 2014

(54) UNINTERRUPTIBLE POWER SUPPLY WITH A DUAL GAIN VOLTAGE REGULATOR CONTROLLING AN INVERTER OUTPUT VOLTAGE BASED ON ACTIVE AND REACTIVE COMPONENTS OF CURRENT

(75) Inventor: Xian Chen, Columbus, OH (US)

(73) Assignee: Liebert Corporation, Columbus, OH (US)

( * ) Notice: Subject to any disclaimer, the term of this patent is extended or adjusted under 35 U.S.C. 154(b) by 735 days.

(21) Appl. No.: 13/038,438

(22) Filed: Mar. 2, 2011

(65) Prior Publication Data

US 2012/0057377 A1 Mar. 8, 2012

Related U.S. Application Data

(60) Provisional application No. 61/313,276, filed on Mar. 12, 2010.

(51) Int. Cl.
*H02J 9/00* (2006.01)

(52) U.S. Cl.
USPC .......................................................... 307/64

(58) Field of Classification Search
USPC .............................. 307/64, 65, 66; 363/37, 95
See application file for complete search history.

(56) References Cited

U.S. PATENT DOCUMENTS

| | | |
|---|---|---|
| 4,400,624 A | 8/1983 | Ebert, Jr. |
| 4,475,047 A | 10/1984 | Ebert, Jr. |
| 5,097,193 A | 3/1992 | Neis et al. |
| 5,461,263 A | 10/1995 | Helfrich |
| 5,465,011 A | 11/1995 | Miller et al. |
| 5,684,686 A | 11/1997 | Reddy |
| 5,978,236 A | 11/1999 | Faberman et al. |
| 6,079,026 A | 6/2000 | Berglund et al. |
| 6,396,170 B1 | 5/2002 | Laufenberg et al. |
| 6,556,459 B2 | 4/2003 | Okui et al. |
| 6,657,321 B2 | 12/2003 | Sinha |
| 6,753,622 B2 | 6/2004 | Oughton, Jr. |
| 7,023,672 B2 | 4/2006 | Goodfellow et al. |
| 7,072,194 B2 | 7/2006 | Nayar et al. |
| 7,072,195 B2 | 7/2006 | Xu |
| 7,259,476 B2 | 8/2007 | Frey |
| 7,274,112 B2 | 9/2007 | Hjort et al. |
| 7,372,177 B2 | 5/2008 | Colombi et al. |
| 7,456,518 B2 | 11/2008 | Hjort et al. |
| 7,479,772 B2 | 1/2009 | Zane et al. |
| 7,518,265 B2 | 4/2009 | Roepke |
| 2001/0033502 A1 | 10/2001 | Blair et al. |
| 2002/0122322 A1 | 9/2002 | Oughon |
| 2002/0195879 A1 | 12/2002 | Okui et al. |

(Continued)

FOREIGN PATENT DOCUMENTS

| | | |
|---|---|---|
| WO | WO-9834314 A1 | 8/1998 |
| WO | WO-03073190 A1 | 9/2003 |

(Continued)

*Primary Examiner* — Rexford Barnie
*Assistant Examiner* — Rasem Mourad
(74) *Attorney, Agent, or Firm* — Harness, Dickey & Pierce, P.L.C.

(57) ABSTRACT

An uninterruptible power supply (UPS) system has an inverter having an output coupled to a primary side of an output transformer. The UPS system has a controller having a dual gain voltage regulator for controlling the output voltage of the inverter of a UPS system that uses active and reactive current components of a load current flowing out an output of the UPS system.

8 Claims, 4 Drawing Sheets

(56) References Cited

U.S. PATENT DOCUMENTS

| | | |
|---|---|---|
| 2003/0062775 A1 | 4/2003 | Sinha |
| 2004/0012266 A1 | 1/2004 | Yu |
| 2004/0088183 A1 | 5/2004 | Nakanishi et al. |
| 2004/0124709 A1 | 7/2004 | Eisenberger et al. |
| 2004/0145357 A1 | 7/2004 | Lynch et al. |
| 2004/0150928 A1 | 8/2004 | Goodfellow et al. |
| 2005/0012395 A1 | 1/2005 | Eckroad et al. |
| 2005/0043859 A1 | 2/2005 | Tsai et al. |
| 2005/0063115 A1 | 3/2005 | Nayar et al. |
| 2005/0117375 A1 | 6/2005 | Xu |
| 2006/0043793 A1 | 3/2006 | Hjort et al. |
| 2006/0043797 A1 | 3/2006 | Hjort et al. |
| 2006/0044846 A1* | 3/2006 | Hjort et al. ............ 363/34 |
| 2006/0164782 A1 | 7/2006 | Colombi et al. |
| 2006/0221523 A1 | 10/2006 | Colombi et al. |
| 2008/0088183 A1 | 4/2008 | Eckroad et al. |
| 2008/0215302 A1 | 9/2008 | Nasle et al. |
| 2008/0231118 A1 | 9/2008 | Roepke |

FOREIGN PATENT DOCUMENTS

| | | |
|---|---|---|
| WO | WO-2004054065 A1 | 6/2004 |
| WO | WO-2005093925 A1 | 10/2005 |
| WO | WO-2006026549 A2 | 3/2006 |
| WO | WO-2007056314 A2 | 5/2007 |
| WO | WO-2008006116 A2 | 1/2008 |

* cited by examiner

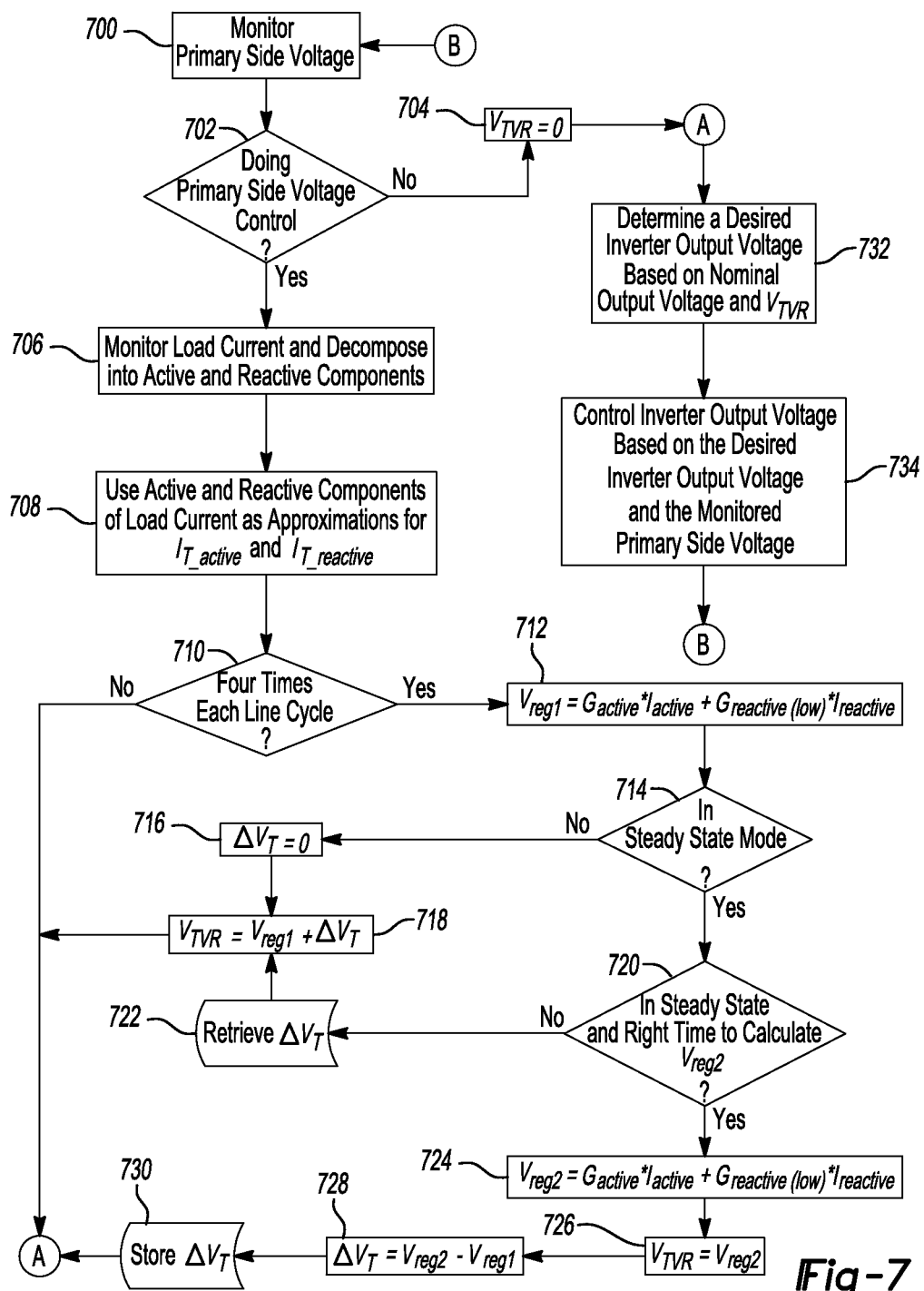

UNINTERRUPTIBLE POWER SUPPLY WITH A DUAL GAIN VOLTAGE REGULATOR CONTROLLING AN INVERTER OUTPUT VOLTAGE BASED ON ACTIVE AND REACTIVE COMPONENTS OF CURRENT

CROSS-REFERENCE TO RELATED APPLICATIONS

This application claims the benefit of U.S. Provisional Application No. 61/313,276, filed on Mar. 12, 2010. The entire disclosure of the above application is incorporated herein by reference.

FIELD

The present disclosure relates to uninterruptible power supply ("UPS") systems, and more particularly, to the control of an intelligent output voltage regulator of the UPS system using dual voltage control based on active and reactive current.

BACKGROUND

This section provides background information related to the present disclosure which is not necessarily prior art.

FIG. 1 shows a typical prior art single module UPS system 100. The basic elements of UPS system 100 are rectifier 102, inverter 104, output transformer 106, a backup DC power source 108, and a controller 110. UPS system 100 also includes a bypass switch (not shown). An input of rectifier 102 is coupled to a source of AC power (not shown). An output of rectifier 102 is coupled to a DC bus 112. An input of inverter 104 is coupled to DC bus 112. An output 105 of inverter 104 is coupled to a primary side 114 of output transformer 106. A secondary side 116 of output transformer 106 is coupled to output 118 of UPS system 100. A Grass filter circuit 120 is coupled to the secondary side 116 of output transformer 106. A filter circuit 122 is coupled to the primary side 114 of output transformer 106.

Controller 100 controls UPS system 100 including controlling inverter 104 by varying the duty cycle of the switching devices in inverter 104 so that inverter 104 provides a desired output voltage. In this regard, controller 110 has inputs 124 and output 126. Inputs 124 include inputs coupled to current transformers CT that sense currents in various parts of UPS 100 such as shown in FIG. 1, including a load current flowing through output 118 of UPS system 100, and voltage sensors VS that sense voltage such as a primary side voltage at primary side 114 of output transformer 106 (if primary side voltage control is being used as discussed below) or a secondary side voltage at secondary side 116 of output transformer 106 (if secondary side voltage control is being used as discussed below).

FIG. 2 shows a simplified output equivalent circuit diagram for UPS system 100. Resistive/inductive (RL) load is coupled to output 118 of UPS system 100. As shown in FIG. 2, in secondary side voltage control, the voltage control reference point is the voltage at secondary side 116 of output transformer 106. As also shown in FIG. 2, in primary side voltage control, the voltage control reference point is the voltage at primary side 114 of output transformer 106.

In many cases, secondary side voltage control of a single module UPS system of the type shown in FIG. 1 is used to get fast transient response and good steady state voltage control. Secondary side voltage control can result in instability issues for single module UPS systems when certain types of loads are being powered by the UPS system, such as high lighting loads. It is also difficult to stabilize multi-module UPS systems using secondary side voltage control. A multi-module UPS system is a UPS system that has multiple UPS modules coupled in parallel. The UPS modules share power providing that the power demanded by the load(s) coupled to the UPS system is equally distributed among the UPS modules.

Primary side voltage control is often used in single module UPS systems having loads of the type that result in instability issues. Primary side control is also often used in multi-module UPS systems as it is difficult to stabilize multi-module UPS systems using secondary side voltage control. By moving the voltage reference point to the primary side of the output transformer, extra impedance is added (i.e. the output transformer) between the voltage control reference point (the primary side of the output transformer) and the load coupled to the output of the UPS system, which makes it easier to stabilize the UPS system and have it perform well.

However, the impedance provided by the output transformer introduces another problem in that the system output voltage will vary with different types of loads since the current will change according to the load, as shown in FIGS. 3A and 3B. For primary side voltage control, FIGS. 3A and 3B show that different load conditions will lead to different current in the space vector. The voltage across the output transformer is $V_T = I_T * j\omega X_T$ (where $j\omega X_T$ is the impedance of output transformer 106 and $I_T$ is the current flowing through output transformer 106). The voltage at the output 118 of UPS system 100 is $V_{load} = V_{out} - V_T$ (where $V_{out}$ is the output voltage of inverter 104). Since a capacitive load causes leading current $I_T$, this results in the space vector $V_{load}$ shown in FIG. 3A. Since an inductive load causes lagging current $I_T$ this results in the space vector $V_{load}$ as shown in FIG. 3B. As can be seen from FIGS. 3A and 3b, with a fixed inverter output voltage $V_{out}$, $V_{load}$ resulting from a capacitive load is bigger than $V_{load}$ resulting from an inductive load, and they will vary with different load sizes. As can be seen from the above, because the current flowing through the output transformer 106 changes with different load conditions, the voltage drop across the output transformer 106 also changes accordingly. This causes the output voltage of the UPS system at output 118 to vary with different types of loads.

Though the equations $V_{load} = V_{out} - V_T$ and $V_T = I_T * j\omega X_T$ are quite simple to understand, complex number operations are always complicated to implement in a digital signal processor (DSP) and will occupy considerable chip resources. Also, current values from current measuring devices are real numbers and it takes more chip resources to convert those real numbers to complex numbers in order to do complex number operations. Further, the equivalent impedance $X_T$ of the output transformer is not a straightforward inductance value. Considering all the above, it's not very practical to use the equations $V_{load} = V_{out} - V_T$ and $V_T = I_T * j\omega X_T$ to dynamically calculate $V_T$ in UPS systems.

SUMMARY

This section provides a general summary of the disclosure, and is not a comprehensive disclosure of its full scope or all of its features.

In accordance with an aspect of the present invention, an uninterruptible power supply (UPS) system has an inverter having an output coupled to a primary side of an output transformer. The output transformer having a secondary side coupled to an output of the UPS system. The UPS system has a controller that monitors a primary side voltage and load current flowing through the output of the UPS system. The controller decomposes the load current into an active and reactive components and uses these as approximations for $I_{T\_active}$ and $I_{T\_reactive}$. The controller determines a voltage drop across the output transformer for a steady state mode of the UPS system ($V_{reg2}$) and also for a continuous mode of the UPS system ($V_{reg1}$), wherein $V_{reg1}$ and $V_{reg2}$ are determined by $$V_{reg1} = G_{active} * I_{T\_active} + G_{reactive(low)} * I_{T\_reactive}$$

$$V_{reg2} = G_{active} * I_{T\_active} + G_{reactive(high)} * I_{T\_reactive}$$

where $G_{reactive(low)}$ is less than 300 and $G_{reactive(high)}$ is greater than 1,000. In each of the two modes, the controller determines a voltage drop across the output transformer ($V_{TVR}$) to use in determining a desired inverter output voltage of the inverter by $$V_{TVR} = V_{reg1} + \Delta V_T$$

where $\Delta V_T$ is zero when the UPS system is not in the steady state mode and $\Delta V_T = V_{reg2} - V_{reg1}$ when the UPS system is in the steady state mode. The controller determines the desired inverter output voltage based on a nominal output voltage of the UPS system and $V_{TVR}$ and controls the inverter output voltage based on the determined desired inverter output voltage and the monitored primary side voltage.

In accordance with an aspect, the value used for $G_{reactive(low)}$ is in the range of 50 to 300 and the value used for $G_{active}$ in determining $V_{reg1}$ is in the range of 1,000 to 2,000 and $G_{reactive(high)}$ is in the range of 4,000 to 6,000 and a value used for $G_{active}$ in determining $V_{reg2}$ is in the range of 100 to 300.

In accordance with an aspect, the controller determines $V_{reg1}$ a plurality of times each line cycle of an AC output voltage of the UPS system and determines $V_{reg2}$ no more than once per second.

In accordance with an aspect, the controller determines $V_{reg1}$ four times each line cycle of the AC output voltage of the UPS system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 is a flow chart showing a basic software program for controlling an inverter output voltage of an inverter of the UPS system of FIG. 6 in accordance with an aspect of the present invention.

Corresponding reference numerals indicate corresponding parts throughout the several views of the drawings.

DETAILED DESCRIPTION

Example embodiments will now be described more fully with reference to the accompanying drawings.

Figure 6:
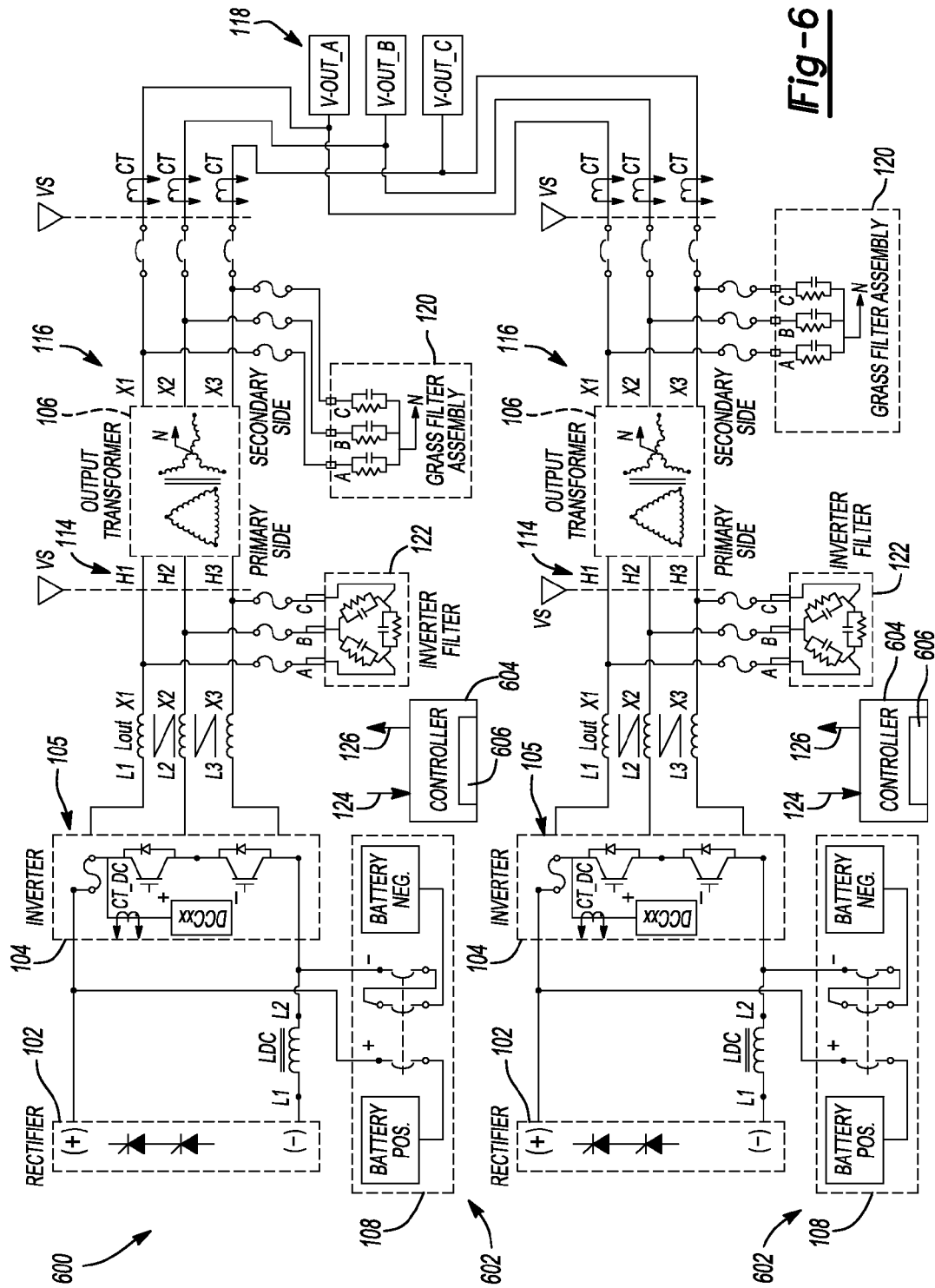
FIG. 6 is a simplified schematic of a multi-module UPS system in accordance with an aspect of the present invention.

In accordance with an aspect of the present invention, a controller having a dual gain voltage regulator for controlling the output voltage of the inverter of a UPS system is implemented using active and reactive current components of a load current flowing out an output of the UPS system. FIG. 6 shows a multi-module UPS 600 in accordance with this aspect of the invention which is illustratively shown as having two single module UPS systems 602 coupled in parallel. UPS systems 602 illustratively have the same components as UPS system 100 with the exception of controller 604. Controller 604 differs from controller 110 of UPS system 100 in that it has the dual gain voltage regulator in accordance with the above aspect of the present invention as discussed in more detail below. Primary side voltage control is used for UPS systems 602 so voltage sensors VS sense primary side voltage at primary side 114 of output transformer 106. It should be understood that primary side voltage could also be sensed at the output of inverter 104 provided that the impedance of inductor $L_{out}$ is taken into account.

Figure 4A:
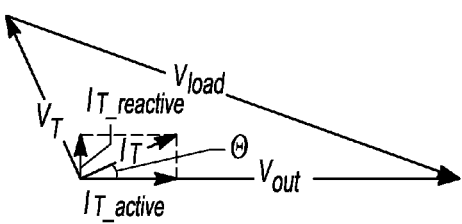
FIGS. 4A and 4B are active and reactive current space vector diagrams for the current flowing through the output transformer of the UPS system of FIG. 1 at capacitive and inductive loads respectively.
Figure 4B:
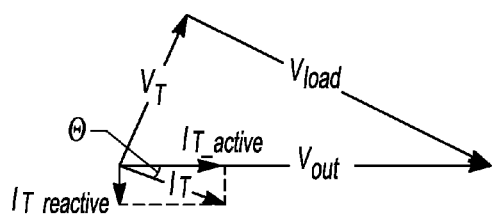

Using a capacitive load as an example, $I_T$ (the current flowing through the output transformer 106) can be decomposed into the sum of two types of current—active current and reactive current. Active current is the current that is in phase with $V_{out}$ (the output voltage of the inverter) and reactive current is the current that is ninety-degrees out of phase with $V_{out}$, as shown in FIG. 4A. In the case of an inductive load, the decomposition of these two types of current will be the same, as shown in FIG. 4B.

In an aspect of the present invention, the following equation is used to indirectly but efficiently estimate the voltage drop across the output transformer ($V_T$) without using complex number operations.

$$V_T = G_{active} * I_{T\_active} + G_{reactive} * I_{T\_reactive} \quad (1)$$

Where $G_{active}$ and $G_{reactive}$ are gains determined as discussed below.

With reference to FIGS. 4A and B, the angle $\theta$ is the angle difference of vector $V_{out}$ and vector $I_T$. $\cos \theta$ Is the power factor at the output of the UPS system, and may illustratively be measured and calculated by controller 604 in known fashion. By using the equations below, the active and reactive current needed for calculation of $V_T$ can be easily obtained:

$$I_{T\_active} = I_T * \cos \theta \quad (2)$$

$$I_{T\_reactive} = I_T * \sin \theta = I_T * \pm \sqrt{(1 - \cos^2 \theta)} \quad (3)$$

Where $\theta = \angle I_T - \angle V_{out}$ and the sign of $I_{T\_reactive}$ is determined by the sign of $\theta$.

Figure 1:
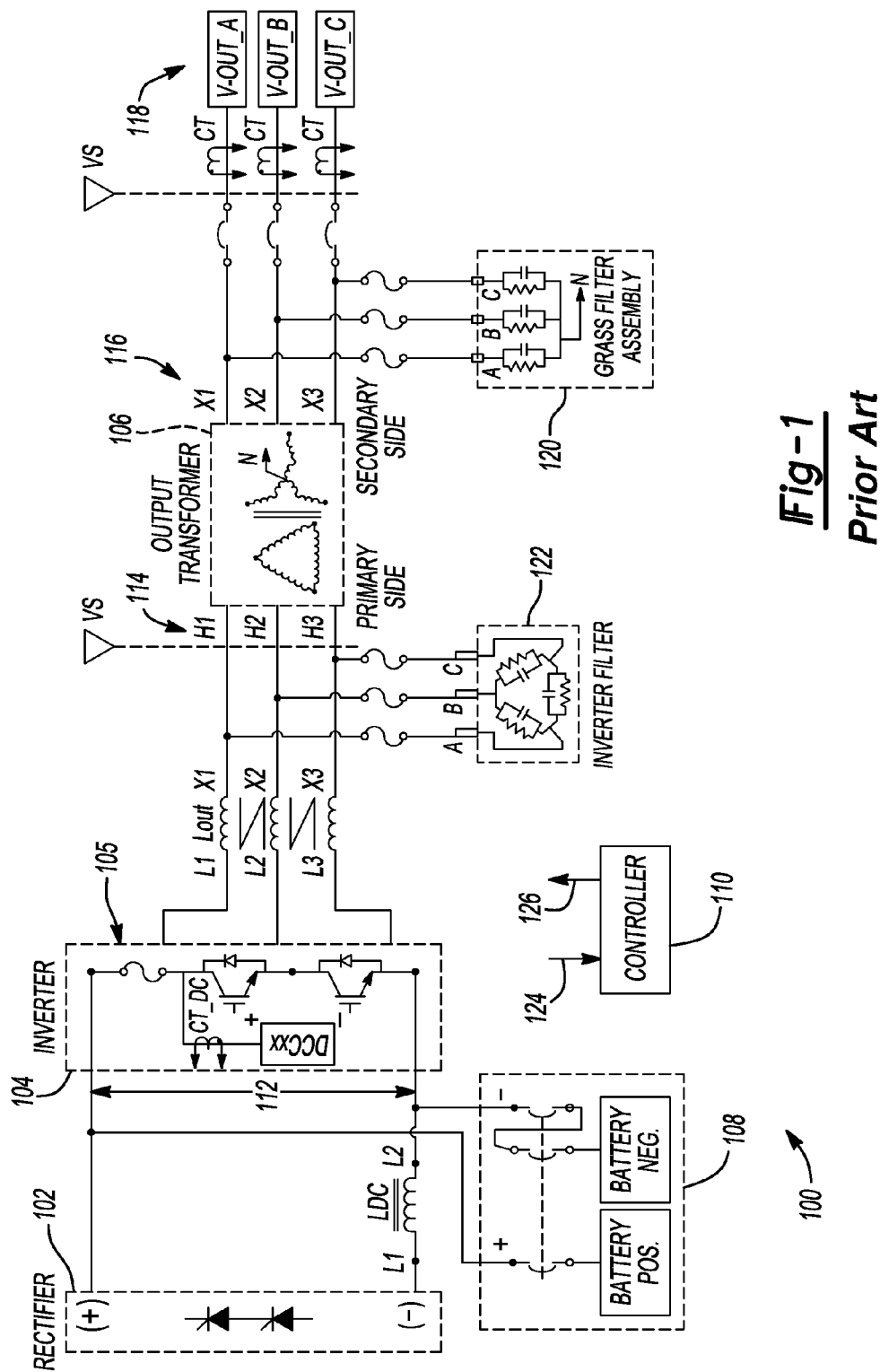
FIG. 1 is a simplified schematic of a prior art UPS system.
Figure 2:
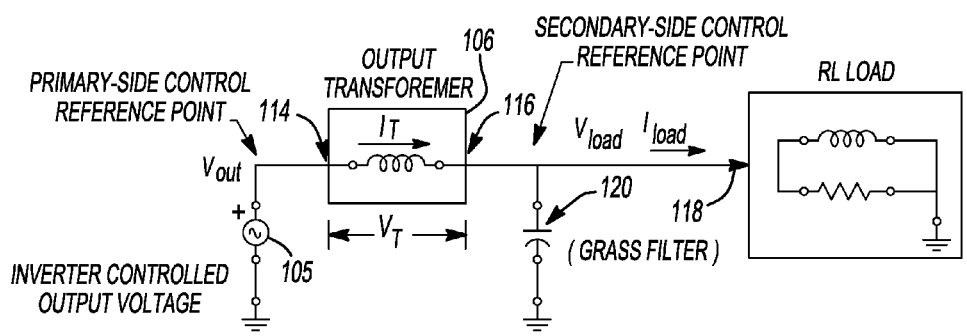
FIG. 2 is a simplified schematic of an output equivalent circuit of the UPS system of FIG. 1.
Figure 3A:
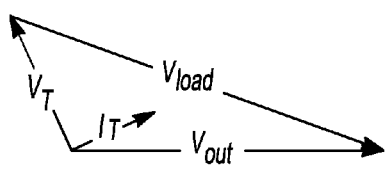
FIGS. 3A and 3B are space vector diagrams for an output transformer circuit of the UPS system of FIG. 1 at capacitive and inductive loads respectively.
Figure 3B:
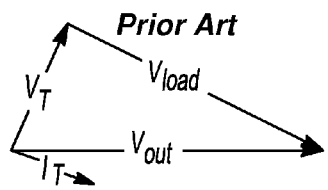

Because there's no current measurement for the current $I_T$ flowing through output transformer 106, $I_T$ is approximated. More specifically, $I_{T\_active}$ and $I_{T\_reactive}$ are approximated. Considering that the current measurements for the output load ($I_{load}$) are already available as shown in FIG. 2, and current flowing into the Grass filter is fairly small compared to $I_T$ (that is, $I_T \approx I_{load}$); Load can be used as an approximation of $I_T$ and the active and reactive current components of $I_{load}$ can be used as approximations for $I_{T\_active}$ and $I_{T\_reactive}$. The above equations become as follows:

$$I_{T\_active} = I_{load} * \cos\theta \qquad (4)$$

$$I_{T\_reactive} = I_{load} * \sin\theta = I_{load} * \pm\sqrt{(1-\cos\theta^2)} \qquad (5)$$

Where $\theta = \angle I_{load} - \angle V_{out}$ and the sign of $I_{T\_reactive}$ is determined by the sign of $\theta$.

Figure 5A:
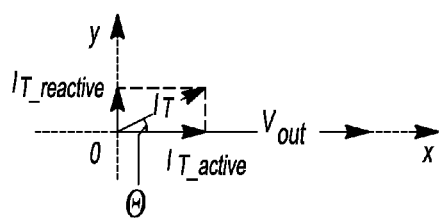
FIGS. 5A and 5B are diagrams showing the active and reactive currents shown as space vectors in FIGS. 4A and 4B on Cartesian coordinates at capacitive and inductive loads respectively.
Figure 5B:
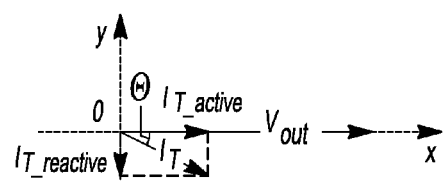

From FIGS. 4A and 4B, $I_T$ was decomposed into two space vectors, $I_{T\_active}$ and $I_{T\_reactive}$ which can be put on Cartesian coordinates as shown in FIGS. 5A and B. As can be seen from FIGS. 5A and 5B, different load conditions will lead to different $I_{T\_active}$ and $I_{T\_reactive}$ results. For all load conditions, $I_{T\_active}$ is always greater than or equal to zero because it's representing real power. Theoretically, the sign of $I_{T\_reactive}$ will change based on different load conditions as follows: Resistive load, $I_{T\_reactive}=0$; Inductive load, $I_{T\_reactive}<0$; and Capacitive load, $I_{T\_reactive}>0$;

But in real UPS systems, because of all the inductive cables, there will always be some reactive power flowing in the system. For a resistive load, $I_{T\_reactive}$ will be less than zero.

In a UPS system, real power is always greater than or equal to zero, but reactive power may be smaller than zero depending on what type of load the system is connected to, which also explains why $I_{T\_reactive}$ may change sign when the load condition changes.

As can be seen from FIGS. 4A and 4B, due to the leading characteristic of $I_T$ for a capacitive load and the lagging characteristic of $I_T$ for an inductive load, the magnitude of $V_{load}$ ($|V_{load}|$) in FIG. 4A is larger than in FIG. 4B. In other words, assuming that both $|I_T|$ and $\theta$ are the same, the magnitude of $V_{load}$ for a capacitive load is always larger than the magnitude of $V_{load}$ for an inductive load. So the gains $G_{active}$ and $G_{reactive}$ need to be tuned in order to meet all load conditions, especially $G_{reactive}$ since reactive current is the main reason to change the magnitude of $V_{load}$. For the same amount of real power, the load drop across the output transformer 106 will depend in large part on how much reactive current is flowing through it and the sign of reactive current. As a result, $G_{reactive}$ should be a large value in order to adjust $I_{T\_reactive}$ to cover all load conditions. For example, $G_{active}=200$ and $G_{reactive}=5000$ are good numbers to estimate $V_T$. It should be understood that these are examples and other values can be used for $G_{active}$ and $G_{reactive}$. In this regard, $G_{active}$ and $G_{reactive}$ may be determined experimentally to optimize performance.

Because of the characteristic of $I_T$, a large value for $G_{reactive}$ will need to be used to estimate $V_T$ in order to achieve good output voltage performance for all load conditions. This makes output voltage regulation very sensitive to reactive current which is fairly easily created in normal UPS operations in multi-module systems, such as transferring from bypass to UPS or adding another UPS module to the common output bus (e.g., output 118 in FIG. 6). With a high $G_{reactive}$ in all circumstances, the transient performance of the UPS system is not very satisfactory, though the output voltage is regulated according to requirements. Also, with uneven cable lengths between the modules, a high $G_{reactive}$ will cause some stability issues for a capacitive load since there will be more circulating reactive power flowing among the modules.

In an aspect, this invention utilizes dual gain voltage regulator 606 that in effect is a combination of two single voltage regulators with two different gains, one with a large $G_{reactive}$ gain termed $G_{reactive(high)}$ and the other with a small $G_{reactive}$ gain termed $G_{reactive(low)}$. Illustratively, $G_{reactive(low)}$ is less than 300, and may illustratively be in the range of 50 to 300. Illustratively, $G_{reactive(high)}$ is greater than 1,000, and may illustratively be in the range of 4,000 to 6,000. Illustratively, $G_{reactive(high)}$ is 5,000 and $G_{reactive(low)}$ is 100. Also, $G_{active}$ gain will change with $G_{reactive}$ gain accordingly, but not by too much. Illustratively, the $G_{active}$ gain used with $G_{reactive(high)}$ is in the range of 100 to 300 and $G_{active}$ gain used with $G_{reactive(low)}$ is in the range of 1,000 to 2,000.

Voltage regulator 606 may illustratively be implemented in software in controller 604 of each UPS system 602. A voltage drop across output transformer 106 when UPS system 602 is in the steady stage mode ($V_{reg2}$ in equation (6) is calculated below using $G_{reactive(high)}$ in equation (1) as follows;

$$V_{reg2} = G_{active} * I_{T\_active} + G_{reactive(high)} * I_{T\_reactive}$$

$V_{reg2}$ is used only when UPS system 602 is in a steady state mode and is calculated no more than once every second, and preferably every several seconds, to prevent stability issues under capacitive load.

A voltage drop across output transformer 106 when UPS system 602 is in the continuous mode ($V_{reg1}$ in equation (6) below) is calculated below using $G_{reactive(low)}$ in equation (1) as follows:

$$V_{reg1} = G_{active} * I_{T\_active} + G_{reactive(low)} * I_{T\_reactive}$$

$V_{reg1}$ is used all the time (continuous mode) to handle both steady state and transition operation, such as when UPS system 602 is transitioning between a bypass mode (discussed below) and UPS mode, when a UPS module is added to the common output bus, or during the intervals that $V_{reg2}$ is not calculated. In these cases, $V_{reg1}$ is calculated a plurality of times every line cycle of the AC output voltage of UPS system 602, preferably, four times every line cycle.

UPS system 602 includes a bypass switch (not shown). When the bypass switch is closed, UPS system 602 is in a bypass mode where AC input power to UPS system 602 is coupled directly to output 118.

When using $G_{reactive(high)}$, voltage regulator 606 can regulate the output voltage of inverter 104 well for all load conditions. When using $G_{reactive(low)}$, voltage regulator 606 will get the output voltage of the inverter 104 close to the desired value.

Equation (6) shows how the large ($G_{reactive(high)}$) and small ($G_{reactive(low)}$) $G_{reactive}$ gains are combined (i.e., how $V_{reg1}$ and $V_{reg2}$ are both utilized) to implement the determination of the voltage drop across output transformer ($V_{TVR}$) in dual gain voltage regulator 606 for use in determining a desired inverter output voltage of inverter 104.

$$V_{TVR} = V_{reg1} + \Delta V_T \qquad (6)$$

Where $\Delta V_T$ is 0 when UPS system 602 is not in the steady state mode and $\Delta V_T = V_{reg2} - V_{reg1}$ is used when UPS system 602 is in the steady state mode (several seconds after getting into UPS mode)

In the steady state mode, $V_{reg2}$ is calculated using $G_{reactive(high)}$ to provide a desired output voltage that meets the voltage requirements. Because of the stability issue, $V_{reg2}$ cannot be calculated as fast as $V_{reg1}$. $\Delta V_T$ is only updated when $V_{reg2}$ is calculated to determine $V_{TVR}$. In transitions like a transfer from bypass mode to UPS mode, $\Delta V_T$ is set to 0 and $V_{reg1}$ is calculated using only $G_{reactive(low)}$ to have good transient voltage performance while still keeping the output voltage of inverter 104 close to where it should be. By using such a combined dual gain voltage regulator 606 in the control of UPS system 602, not only is good steady state voltage performance maintained for all load conditions without sacrificing transient performance, but stability and reliability of the UPS system 602 is improved under capacitive load conditions.

FIG. 7 is a flow chart showing basic steps of an illustrative implementation of a program for controller 604 implementing the above described control of inverter 104 including dual gain voltage regulator 606 and the use of active and reactive components of the load current. At 700, controller 604 monitors the primary side voltage such as at primary side 114 of output transformer 106. At 702, controller 604 determines whether primary side voltage control is being used. If not, at 704, controller 604 sets $V_{TVR}$ to zero and branches to 732. If primary side voltage control is being used, at 706, controller 604 monitors the load current flowing out of output 118 of UPS system 100 and decomposes the load current into active and reactive components. At 708, controller uses the active and reactive components of the load current as approximations of $I_{T\_active}$ and $I_{T\_reactive}$.

At 710, controller 604 determines whether it is time to calculate $V_{reg1}$, which illustratively is done four times every line cycle as discussed above. If not, controller 604 branches back to 732. If so, at 712 controller 604 calculates $V_{reg1}$ as discussed above.

At 714, controller 604 checks whether UPS system 602 is in the steady state mode. If not, at 716 $\Delta V_T$ is set to zero, and at 718, controller 604 calculates $V_{TVR}$ in accordance with equation (6) above. Controller 604 then branches to 732.

If UPS system 602 is in the steady state mode, at 720 controller 604 determines whether it is time to calculate $V_{reg2}$. If not, at 722 controller 604 retrieves $\Delta V_T$ and then branches to 718 where it calculates $V_{TVR}$. If it is time to calculate $V_{reg2}$, at 724 controller 604 calculates $V_{reg2}$ as discussed above. Then, at 726, controller 604 sets $V_{TVR}$ equal to $V_{reg2}$ and at 728, controller 604 calculates $\Delta V_T$ as discussed above and at 730, $\Delta V_T$ is stored in memory. Controller 604 then branches to 732.

At 732, controller 604 determines a desired inverter output voltage based on the nominal output voltage of UPS system 602 and $V_{TVR}$. At 734, controller 604 controls the inverter output voltage of inverter 104 based on the determined desired inverter output voltage and the monitored primary side voltage. Controller 604 then branches back to 700.

In an aspect, controller 604 in which the foregoing combined dual gain voltage regulator 606 is implemented may illustratively be a DSP or other microprocessor or microcontroller. It should be understood the combined dual gain voltage regulator could be implemented with other electronic devices and systems, such as a Field Programmable Gate Array (FPGA) or an application specific integrated circuit (ASIC), by way of example and not of limitation. These devices may be used for controller 604, or in addition to controller 604 so as to implement the combined gain dual voltage regulator in a separate device which may then communicate its determination of the desired output voltage for inverter 104 to the controller 604.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of controlling an output voltage of an inverter of an uninterruptible power supply (UPS) system, the UPS system including an output transformer having a primary side coupled to an output of the inverter and a secondary side coupled to an output of the UPS system, a controller that monitors a primary side voltage and load current flowing through the output of the UPS system, the method comprising:
   a. decomposing with the controller the load current into active and reactive components and using them as approximations for $I_{T\_active}$ and $I_{T\_reactive}$;
   b. determining with the controller a voltage drop across the output transformer for a steady state mode of the UPS system ($V_{reg2}$) and also for a continuous mode of the UPS system ($V_{reg1}$), wherein $V_{reg1}$ and $V_{reg2}$ are determined by $$V_{reg1} = G_{active} * I_{T\_active} + G_{reactive(low)} * I_{T\_reactive}$$

$$V_{reg2} = G_{active} * I_{T\_active} + G_{reactive(high)} * I_{T\_reactive}$$

where $V_{reg1}$ is the voltage drop across the output transformer for a continuous mode of the UPS system, $V_{reg2}$ is the voltage drop across the output transformer for a steady state mode of the UPS system, $G_{reactive(low)}$ is a gain less than 300, $G_{reactive(high)}$ is a pain greater than 1,000, $I_{T\_active}$ is the active component of the load current, and $I_{T\_reactive}$ is the reactive component of the load current, and
   c. in each of the two modes, determining with the controller a voltage drop across the output transformer ($V_{TVR}$) to use in determining a desired inverter output voltage of the inverter by $$V_{TVR} = V_{reg1} + \Delta V_T$$

where $V_{TVR}$ is the voltage drop across the output transformer to use in determining a desired inverter output voltage, $\Delta V_T$ is zero when the UPS system is not in the steady state mode and $\Delta V_T = V_{reg2} - V_{reg1}$ when the UPS system is in the steady state mode; and
   d. determining with the controller a desired inverter output voltage based on a nominal output voltage of the UPS system and $V_{TVR}$ and controlling an actual inverter output voltage based on the desired inverter output voltage and the monitored primary side voltage.

2. The method of claim 1, including using a value in the range of 50 to 300 for $G_{reactive(low)}$ and a value in the range of 1,000 to 2,000 for $G_{active}$ in determining $V_{reg1}$ and using a value in the range of 4,000 to 6,000 for $G_{reactive(high)}$ and a value in the range of 100 to 300 for $G_{active}$ in determining $V_{reg2}$.

3. The method of claim 2 including determining $V_{reg1}$ a plurality of times each line cycle of an AC output voltage of the UPS system and determining $V_{reg2}$ no more than once per second.

4. The method of claim 3 including determining $V_{reg1}$ four times each line cycle of the AC output voltage of the UPS system.

5. An uninterruptible power supply (UPS) system, comprising:
   a. an inverter having an output coupled to a primary side of an output transformer, the output transformer having a secondary side coupled to an output of the UPS system;
   b. a controller configured to monitor a primary side voltage and load current flowing through the output of the UPS system, decompose the load current into an active and reactive components and uses them as approximations for $I_{T\_active}$ and $I_{T\_reactive}$;
   c. the controller configured to determine a voltage drop across the output transformer for a steady state mode of the UPS system ($V_{reg2}$) and also for a continuous mode of the UPS system ($V_{reg1}$), wherein $V_{reg1}$ and $V_{reg2}$ are determined by $$V_{reg1} = G_{active} * I_{T\_active} + G_{reactive(low)} * I_{T\_reactive}$$

$$V_{reg2} = G_{active} * I_{T\_active} + G_{reactive(high)} * I_{T\_reactive}$$

where $V_{reg1}$ is the voltage drop across the output transformer for a continuous mode of the UPS system, $V_{reg2}$ is the voltage drop across the output transformer for a steady state mode of the UPS system, $G_{reactive(low)}$ is a gain less than 300, $G_{reactive(high)}$ is a gain greater than 1,000, $I_{T\_active}$ is the active component of the load current, and $I_{T\_reactive}$ is the reactive component of the load current; and d. in each of the two modes, the controller configured to determine a voltage drop across the output transformer ($V_{TVR}$) to use in determining a desired inverter output voltage of the inverter by $$V_{TVR} = V_{reg1} + \Delta V_T$$

where $V_{TVR}$ is the voltage drop across the output transformer to use in determining a desired inverter output voltage, $\Delta V_T$ is zero when the UPS system is not in the steady state mode and $\Delta V_T = V_{reg2} - V_{reg1}$ when the UPS system is in the steady state mode; and e. the controller configured to determine the desired inverter output voltage based on a nominal output voltage of the UPS system and $V_{TVR}$ and controlling the inverter output voltage based on the determined desired inverter output voltage and the monitored primary side voltage.

6. The UPS system of claim 5 wherein $G_{reactive(low)}$ is in the range of 50 to 300 and the value used for $G_{active}$ in determining $V_{reg1}$ is in the range of 1,000 to 2,000 and $G_{reactive(high)}$ is in the range of 4,000 to 6,000 and a value used for $G_{active}$ in determining $V_{reg2}$ is in the range of 100 to 300.

7. The UPS system of claim 6 wherein the controller is configured to determine $V_{reg1}$ a plurality of times each line cycle of an AC output voltage of the UPS system and determines $V_{reg2}$ no more than once per second.

8. The UPS system of claim 7 wherein the controller is configured to determine $V_{reg1}$ four times each line cycle of the AC output voltage of the UPS system.

\* \* \* \* \*

UNITED STATES PATENT AND TRADEMARK OFFICE
CERTIFICATE OF CORRECTION

PATENT NO.      : 8,791,597 B2  
APPLICATION NO. : 13/038438  
DATED           : July 29, 2014  
INVENTOR(S)     : Xian Chen Page 1 of 1

It is certified that error appears in the above-identified patent and that said Letters Patent is hereby corrected as shown below:

In the Specification

<u>Column 5,</u>

Line 31, delete "($\Box V_{load}$)" and insert --$(|V_{load}|)$--.

In the Claims

<u>Column 8,</u>

Line 21, claim 1, delete "pain" and insert --gain--.

Signed and Sealed this  
Seventeenth Day of May, 2016

Michelle K. Lee  
*Director of the United States Patent and Trademark Office*